United States Patent

Hughes

[15] 3,704,456

[45] Nov. 28, 1972

[54] ASSOCIATIVE STORAGE ELEMENT

[72] Inventor: John Barry Hughes, Brighton, England

[73] Assignee: U.S. Philips Corporation, New York, N.Y.

[22] Filed: Oct. 19, 1971

[21] Appl. No.: 190,556

[30] Foreign Application Priority Data

Oct. 22, 1970 Netherlands..............7015435

[52] U.S. Cl. ...........340/173 AM, 307/231, 307/238, 307/291, 307/299, 340/173 FF

[51] Int. Cl........G11c 15/00, G11c 7/00, G11c 11/40

[58] Field of Search..340/173 AM, 173 FF; 307/238, 307/231, 291, 299

[56] References Cited

UNITED STATES PATENTS 3,423,737 1/1969 Harper.................340/173 FF

OTHER PUBLICATIONS

Wiedmann, Write–Sense Amplifiers, 5/68, IBM Technical Disclosure Bulletin, Vol. 10, No. 12, pp. 1998–1999.

*Primary Examiner*—Terrell W. Fears
*Assistant Examiner*—Stuart Hecker
*Attorney*—Frank R. Trifari

[57] ABSTRACT

The invention provides an associative flip-flop storage element which does not go into stauration, thereby providing a fast switching rate with comparatively low voltage variations across the drive conductors for carrying out write and comparison processes.

1 Claim, 1 Drawing Figure

PATENTED NOV 28 1972
3,704,456
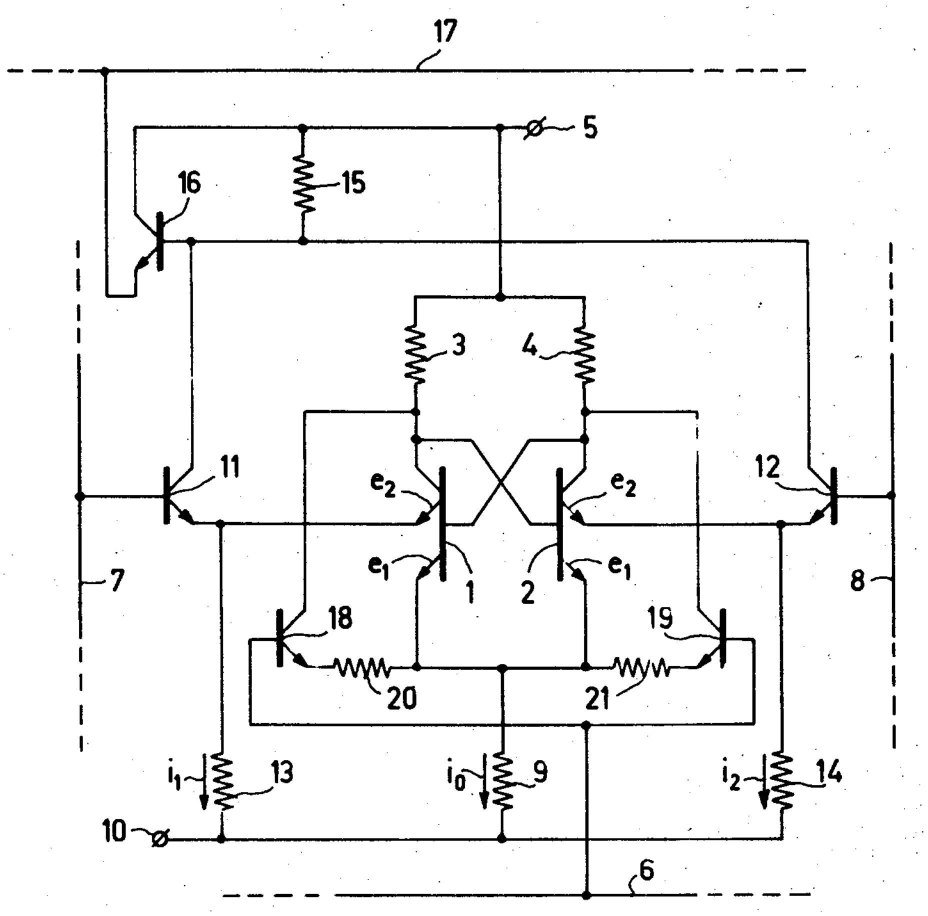
*INVENTOR.*
JOHN BARRY HUGHES
*BY*
Frank R. Trifari
AGENT

ASSOCIATIVE STORAGE ELEMENT

The invention relates to an associative storage element comprising a pair of multi-emitter transistors each having two emitter regions, a base region and a collector region, the collector regions of the multi-emitter transistors being connected through separate impedances to a potential supply terminal, the collector region and the base region of one multi-emitter transistor being crosswise coupled with the collector region and the base region of the other multi-emitter transistor in order to form two stable states, in each of which a different one of the two multi-emitter transistors is conductive, wherein two first emitter regions of the two multi-emitter transistors are connected to each other and are coupled with a terminal for a worddrive conductor and two second emitter regions of the two multi-emitter transistors are each coupled with a corresponding terminal of a pair of terminals for two bit drive conductors.

An associative storage element of this type is known from the review: "Microelectronics," No. 2, February 1969, pages 22 to 24. The associative storage element disclosed therein comprises a saturation flip-flop and two first emitters are directly connected to the word-drive conductor and the two second emitters are directly connected to the bit drive conductors. This associative storage element has the disadvantage that in writing new information the switching rate is comparatively low and that comparatively high voltage variations across the drive conductors are required for carrying out the write and comparison processes on the storage element.

The invention has for its object to provide a new concept of the associative storage element referred to above, in which said disadvantages are obviated.

The associated storage element according to the invention is characterized in that the two first emitters are connected through an impedance to a second potential supply terminal and a second pair of transistors is provided, each of which comprises an emitter region, a base region and a collector region, the emitter region of each transistor of the second pair of transistors being connected to the second emitter region of a corresponding multi-emitter transistor and via an impedance to the second potential supply terminal, the collector regions of the two transistors of the second pair being connected to an and-gate, the output of which forms the terminal for a word compare conductor and the base regions of the two transistors of the second pair forming the terminals for the two bit drive conductors, there being provided a third pair of transistors, each of which comprises an emitter region, a base region and a collector region, the emitter region and the collector region of each transistor of the third pair being connected to the first emitter region and the collector region respectively of a corresponding multi-emitter transistor and the base regions of the transistors of the third pair being connected to each other and forming the terminal for the worddrive conductor.

The invention and its advantages will now be described more fully with reference to an embodiment shown in the drawing.

The associative storage element shown in the FIGURE comprises a pair of multi-emitter transistors 1 and 2, each comprising a first emitter $e_1$, a second emitter $e_2$, a base and a collector. The collectors of the transistors 1 and 2 are separately connected through the resistors 3 and 4 to a potential supply terminal 5. The collector and the base of transistor 1 are crosswise coupled with the collector and the base of transistor 2. This provides two stable states, in each of which a different one of the transistors 1 and 2 is conducting. The emitter $e_1$ of the transistors 1 and 2 are connected to each other and coupled with the worddrive conductor 6. The emitters $e_2$ of the transistors 1 and 2 are coupled with the bit drive conductors 7 and 8 respectively.

The storage element shown forms part of a matrix of storage elements. Each storage element forms part of a horizontal group, that is to say a row and of a vertical group, that is to say a column. The word drive conductor 6 is common to all storage elements that are arranged in the same row. The bit drive conductors 7 and 8 are common to all storage elements that are arranged in the same column.

The transistors 1 and 2 form the basic flip-flop of the associative storage element for storing the binary information "0" or "1." In a known embodiment the emitters $e_1$ are directly connected to the word drive conductor 6 and the emitters $e_2$ are directly connected to the bit drive conductors 7 and 8. In this known embodiment the conducting multi-emitter transistor is in the state of saturation. The switching rate of the associative storage element in writing a new binary information is therefore comparatively low. In the known embodiment the word-drive conductor 6 is in addition employed as a word compare conductor, i.e., in the state of compare this conductor provides an indication about the equality or inequality between the bit supplied through the bit drive conductors 7 and 8 and the bit stored in the basic flip-flop. In the known embodiment the potential of the word drive conductor 6 is normally more positive than that of the bit drive conductors 7 and 8. In the state of compare the potential of one of the bit drive conductors 7 and 8 is rendered, in accordance with the bit value, more positive than that of the word drive conductor 6. When the bit drive conductor 7 is raised in potential and the multi-emitter transistor 1 conveys current, the current of this transistor will flow to the word drive conductor 6. If, on the other hand the multi-emitter transistor 2 conveys current, no current will flow to the worddrive conductor. In this way inequality or equality between the supplied bit and the stored bit is indicated by the presence or the absence respectively of current through the worddrive conductor. A difficulty is that in the state of inequality the potential of the worddrive conductor is raised due to the flow of current. This raised potential has to remain below the trigger level of the basic flip-flop in order to avoid a change of state thereof. It is possible to raise the trigger level of the basic flip-flop, for example, by using amplifying transistors in the crosscoupling between the collectors and the bases of the multi-emitter transistors 1 and 2, but it is then more difficult to switch over the basic flip-flop when writing new information. A further disadvantage of the known embodiment is that in the rest condition the current of the conducting multi-emitter transistor passes through the corresponding bit drive conductor. The potential of the bit drive conductors is therefore strongly dependent upon the information pattern in the relevant vertical group.

In order to obviate said disadvantages the emitters $e_1$ of the transistors 1 and 2 in the embodiment of the invention are connected through a resistor 9 to a potential supply terminal 10. A second pair of transistors 11 and 12 is provided. The emitter of transistor 11 is connected to the emitter $e_2$ of transistor 1 and via a resistor 13 to the potential supply terminal 10. The emitter of transistor 12 is connected to the emitter $e_2$ of transistor 2 and via a resistor 14 to the potential supply terminal 10. The collectors of the transistors 11 and 12 are connected to one end of a resistor 15 and to the base of a transistor 16. The other end of resistor 15 and the collector of transistor 16 are connected to the potential supply terminal 5. The emitter of transistor 16 forms the terminal for connecting the word compare conductor 17, which is common to the relevant horizontal group. As will be explained more fully hereinafter the circuit connections described between the collectors of the transistors 11 and 12 and the resistor 15 and the transistor 16 provide an and-function. The bases of the transistors 11 and 12 form the terminals for connecting the bit drive conductors 7 and 8.

The associative storage element is the embodiment of the invention comprises a third pair of transistors 18 and 19. The emitter of transistor 18 is connected through a resistor 20 to the emitter of transistor 1 and the collector of transistor 18 is connected to the collector of transistor 1. The emitter of transistor 19 is connected through a resistor 21 to the emitter of transistor 2 and the collector of transistor 19 is connected to the collector of transistor 2. The bases of the transistors 18 and 19 are connected to each other and form the terminal for connecting the worddrive conductor 6. The operation of the associative storage element will be described in terms of assumed current and voltage values approaching the real values sufficiently for obtaining a representative picture of the operation thereof.

The currents through the resistors 9, 13 and 14: $i_0$, $i_1$ and $i_2$ respectively, are assumed to have the constant values of 2 mA, 1 mA and 1 mA respectively. The resistors 3 and 4 are assumed to have the value of 100 Ohms. The two possible voltage levels of the bit drive conductors 7 and 8 are assumed to be −150 mV and −400 mV. The potential supply terminal 5 is supposed to have a voltage of 0 Volt. The potential of the potential supply terminal 10 is supposed to be negative. The word drive conductor 6 has a low voltage of −225 mV when not selected and has a voltage of 0 Volt when selected.

A description will now be given of three different states, i.e., the state in which the supplied bit is equal to the stored bit (state of equality), the state in which the supplied bit is unequal to the stored bit (state of inequality) and the state in which a bit is written in the storage element (state of writing). Each bit may have the value "0" or "1." Owing to the symmetry of the storage element there is also symmetry in the operation for a bit of the value "0" and for a bit of the value "1." The description of said three states is restricted to one bit value. The operation for the other bit value can be directly derived therefrom on the basis of the symmetry of the storage element.

1. State of equality

It is assumed that the bit drive conductor 7 has a voltage of −150 mV and that bit drive conductor 8 has a voltage of −400 mV and that transistor 2 conveys the current $i_0$ on the emitter $e_1$. The word drive conductor 6 of the horizontal group to which the storage element belongs and of all other horizontal groups is kept at the voltage of −225 mV. This voltage keeps the transistor 18 and 19 of all the storage elements in the non-conducting condition. The collector voltage of transistor 2 is compared via the transistors 1 and 11 with the voltage of the bit drive conductor 7. As a result of the current $i_0$ alone, a voltage drop of 200 mV will occur across the resistor 4, so that the collector voltage of transistor 7 will be at a voltage of −200 mV owing to the current $i_0$ alone. This voltage is more negative than the voltage of the bit drive conductor 7 so that the current $i_1$ will pass through the transistor 11. The collector voltage of transistor 1 is compared via the transistors 2 and 12 with the voltage of the bit drive conductor 8. Transistor 1 does not convey current, so that the collector voltage is equal to 0 Volt. This voltage is more positive than the voltage of the bit drive conductor 8, so that the current $i_2$ will pass through the transistor 2 (emitter $e_2$). Therefore, transistor 2 conveys the current $i_0+i_2$, the collector thus having a a voltage of −300 mV. Lowering bit drive conductor 8 to a voltage of −400 mV thus results in adding a current of 1 mA to the conducting transistor 2 of the basic flip-flop leaving the information content thereof unchanged.

The current $i_1$ produces across the resistor 15 a voltage drop of −390 mV, when the resistor 15 has a value of 390 Ohms. In the word compare indicator (not shown) connected to the word compare conductor 17, the voltage of conductor 17 is compared with −200 mV. If the voltage at the base of transistor 16 is more positive than −200 mV, the transistor 16 is conductive and if the voltage at the base is more negative than −200 mV, as in the present case, transistor 16 is cut off. If in all associative storage elements of the same horizontal group as the storage elements under consideration the transistor 16 is cut off, no current flows through the word compare conductor 17. The absence of current through the word compare conductor is indicative of the fact that the group of bits, that is to say the word applied to the horizontal group, is equal to the word stored in the horizontal group.

2. State of inequality

It is assumed that the bit drive conductor 7 has a voltage of −400 mV and that the bit drive conductor 8 has a voltage of −150 mV and that transistor 2 conveys the current $i_0$ on the emitter $e_1$. The word drive conductor 6 of the horizontal group to which the storage element belongs and of all other horizontal groups is kept at the voltage of −225 mV. This voltage keeps the transistors 18 and 19 of all the storage elements in the non-conducting condition. In the state under consideration transistor 1 conveys the current $i_1$ (emitter $e_2$) and transistor 2 conveys not only the current $i_0$ but also the current $i_2$ (emitter $e_2$). The collector of transistor 1 has a voltage of −100 mV and the collector of transistor 2 has a voltage of −300 mV. Lowering the bit drive conductor 7 to the voltage of −400 mV has resulted in adding a current of 1 mA to both transistors of the basic flip-flop leaving the information content thereof unaltered. The transistors 11 and 12 do not convey current so that in this case a current can flow from the potential supply terminal 5 via resistor 15 to the base of transistor 16. This current renders transistor 16 conductive so that a current passes through the word compare conductor 17. The presence of current through conductor 17 is indicative of the fact that in at least one of the storage elements of the same horizontal group as that of the storage element under consideration inequality prevails between the supplied bit and the stored bit.

The condition for transistor 16 to be conductive is that transistor 11 and transistor 12 do not convey current. If $Z=1$ designates the conductive state of transistor 16, $Z=0$ the cut-off state, $X=1$ and $Y=1$ the cut-off state of transistors 11 and 12 respectively and $X=0$, $Y=0$ the conductive states, it applies that: $Z = X \cdot Y$, wherein the dot represents the logical product of the "and-function." If $C=1$ designates the absence of current through the word compare conductor 17 and $C=1$ the presence of current, it applies that:

$$C = Y_2/(X_1 \cdot Y_1 + X_2 \cdot + \ldots + X_n \cdot Y_n)$$

wherein $X_i$ and $Y_i$ with $i=1, 2 \ldots n$ represent the variables of the $i^{th}$ storage element and $n$ is the number of storage elements of the horizontal group. $C=1$ is indicative of equality.

3. State of writing

It is assumed that the bit drive conductor 7 has a voltage of −150 mV and the bit drive conductor 8 has a voltage of −400 mV. The bit supplied as a result thereof to the associative storage element may than have the value "0." For writing this bit in the associative storage element the voltage of the word drive conductor 6 is raised to 0 Volt. The transistors 18 and 19 will then take over the current $i_0$ from the basic flip-flop and in the ideal case each of these transistors will convey half of the current $i_0$. The information stored in the basic flip-flop is destroyed by this current take-over. The voltage drop across the resistors 3 and 4 due to the current $i_0/2$ alone is 100 mV so that the collectors of the transistors 1 and 2 are at a voltage of −100 mV as a result of the current $i_0$ alone. The collector voltage of transistor 1 is more positive than the voltage of the bit drive conductor 8 so that the transistor 2 will convey the current $i_2$ (emitter $e_2$). The collector voltage of the transistor 2 as a result of the current $i_0/2$ and the current $i_2$ is then −200 mV. The collector voltage of transistor 2 is more negative than the voltage of the bit drive conductor 7 so that the current $i_1$ passes through transistor 11. The collector voltage of transistor 1 is then −100 mV so that a voltage difference of 100 mV exists between the collectors of the transistors 1 and 2.

In the state in which the voltage of the word drive conductor 6 is high, the transistor 16 is cut off ($Z=X \cdot Y =0$). This applies to all associative storage elements of the same horizontal group as the storage element under consideration so that equality is indicated ($C=1$).

When the voltage of the word drive conductor 6 is reduced, the current through the transisters 11 and 12 decreases whereas the current through the basic flip-flop increases. The initial voltage difference of 100 mV between the collectors of the transistors 1 and 2 ensures that approximately the whole of this current flows to one of these transistors, in this case to transistor 2. The initial voltage difference of 100 mV thus increases to 200 mV. As a result the loop amplification of the basic flip-flop increases and when it has exceeded 1, the new information is written in the storage element.

The word drive conductors of the not selected horizontal groups are kept at −225 mV during the writing in the selected horizontal group so that all the non-selected groups are in a state of comparison. As a consequence the word supplied to the selected horizontal group does not destroy the words in the non-selected horizontal groups.

The property that during writing of a new word equality is indicated in the selected horizontal group may effectively be employed when the associative store is used for selecting in a conventional store. The decoder employed for selecting in the associative store then need not drive in addition the conventional store.

The resistors 20 and 21 serve for stabilizing the current through the transistors 11 and 12, when the potential of the word drive conductor 6 is high.

By way of illustration the following data are given for an associative storage element in a practical embodiment.

Resistor 9 : 330 Ohms
Resistor 13: 680 Ohms
Resistor 14: 680 Ohms
$V_{cc} - V_{be}$ : 0,75 V wherein $-V_{cc}$ is the potential of terminal 10 and $V_{be}$ is the base-emitter voltage of the npn-type transistors used.

The time lag between the application of a bit to the bit drive conductors and the appearance of the equality indication $C=1$ is about 15 nsec. Between the selection of a word drive conductor and the appearance of the equality indication at the word compare conductor the time lag is about 18 nsec.

What is claimed is:

1. An associative storage element comprising a pair of multi-emitter transistors each having two emitter regions, a base region and a collector region, the collector region of the multi-emitter transistors being connected through separate impedances to a potential supply point, the collector region and the base region of one multi-emitter transistor being crosswise coupled with the collector region and the base region of the other multi-emitter transistor in order to form two stable states, in each of which a different one of the two multi-emitter transistors is conductive wherein two first emitter regions of the two multi-emitter transistors are connected to each other and are coupled with a terminal for a word drive conductor and two second emitter regions of the two multi-emitter transistors are each coupled with a corresponding terminal of a pair of terminals for two bit drive conductors, characterized in that the two first emitter regions are connected through an impedance to a second potential supply terminal and a second pair of transistors is provided, each having an emitter region, a base region and a collector region, the emitter region of each transistor of the second pair of transistors being connected to the second emitter region of a corresponding multi-emitter transistor and through an impedance to the second potential supply terminal, the collector regions of the two transistors of the second pair being connected to an and-gate, the output of which forms the terminal for a word compare conductor and the base regions of the two transistors of the second pair forming the terminals for the two bit drive conductors, there being provided a third pair of transistors, each having an emitter region, a base region and a collector region, the emitter region and the collector region of each transistor of the third pair being connected to the first emitter region and the collector region respectively of a corresponding multi-emitter transistor and the base regions of the transistors of the third pair being connected to each other and forming the terminal for the word drive conductor.

* * * * *